(12) United States Patent
Fulger et al.

(10) Patent No.: US 9,799,219 B2
(45) Date of Patent: Oct. 24, 2017

(54) VEHICLE DATA SYSTEM AND METHOD

(71) Applicant: TomTom Traffic B.V., Amsterdam (NL)

(72) Inventors: Daniel Fulger, Duisburg (DE); Peter Mieth, Berlin (DE); Steffen Gunther Wiesner, Berlin (DE)

(73) Assignee: TomTom Traffic B.V., Amsterdam (NL)

( * ) Notice: Subject to any disclaimer, the term of this patent is extended or adjusted under 35 U.S.C. 154(b) by 0 days.

(21) Appl. No.: 14/856,648

(22) Filed: Sep. 17, 2015

(65) Prior Publication Data

US 2016/0005314 A1    Jan. 7, 2016

Related U.S. Application Data

(63) Continuation of application No. 13/884,042, filed as application No. PCT/EP2011/069661 on Nov. 8, 2011, now Pat. No. 9,154,909.

(30) Foreign Application Priority Data

Nov. 8, 2010   (GB) .................................. 1018815.9
Sep. 30, 2011  (GB) .................................. 1116928.1

(51) Int. Cl.
*G08G 1/0967* (2006.01)
*G01C 21/34* (2006.01)
(Continued)

(52) U.S. Cl.
CPC ... *G08G 1/096775* (2013.01); *G01C 21/3415* (2013.01); *G01C 21/3453* (2013.01);
(Continued)

(58) Field of Classification Search
CPC ...... G06F 15/00; G08B 21/10; G08G 1/0967; G08G 1/096775; G08G 1/096827;
(Continued)

(56) References Cited

U.S. PATENT DOCUMENTS 6,304,816 B1   10/2001   Berstis
6,317,686 B1   11/2001   Ran
(Continued)

FOREIGN PATENT DOCUMENTS

EP   1566665 A1    8/2005
JP   H07334786 A  12/1995
(Continued)

OTHER PUBLICATIONS

International Search Report of International Application No. PCT/EP2011/069661 dated Feb. 17, 2012.

*Primary Examiner* — Hung T Nguyen

(57) ABSTRACT

A server system configured to communicate with a device that is installable in a vehicle, such as a portable or in-built navigation device, comprises a communications resource for receiving vehicle data indicative of a parameter of the vehicle; and a processing resource operable to obtain weather data and to process the weather data and the vehicle data to determine at least one weather-related condition in dependence on both the weather data and the vehicle data.

15 Claims, 4 Drawing Sheets

(51) Int. Cl.
*G01C 21/36* (2006.01)
*G08G 1/0968* (2006.01)
*H04L 29/08* (2006.01)
*H04W 4/02* (2009.01)

(52) U.S. Cl.
CPC ..... *G01C 21/3492* (2013.01); *G01C 21/3691* (2013.01); *G08G 1/0967* (2013.01); *G08G 1/096827* (2013.01); *G08G 1/096844* (2013.01); *H04L 67/18* (2013.01); *H04W 4/02* (2013.01)

(58) Field of Classification Search
CPC .......... G08G 1/096844; G01C 21/3492; G01C 21/3691; G01C 21/3453; G06Q 10/06; H04W 4/02; H04L 29/08; H04L 67/18
USPC ...... 340/539.11, 539.13, 905, 995.1, 995.13, 340/995.19; 701/202, 207, 208, 209; 702/2–3, 188
See application file for complete search history.

(56) References Cited

U.S. PATENT DOCUMENTS

| | | | |
|---|---|---|---|
| 6,631,322 B1 | 10/2003 | Arthur et al. | |
| 7,027,915 B2* | 4/2006 | Craine | G08G 1/096716 340/907 |
| 7,053,780 B1 | 5/2006 | Straub et al. | |
| 7,248,159 B2 | 7/2007 | Smith et al. | |
| 7,376,509 B2 | 5/2008 | Endo et al. | |
| 7,406,382 B2 | 7/2008 | Brulle-Drews | |
| 7,421,334 B2 | 9/2008 | Dahlgren et al. | |
| 7,463,973 B2* | 12/2008 | Okude | G01C 21/3492 340/905 |
| 7,706,964 B2 | 4/2010 | Horvitz et al. | |
| 7,999,702 B2 | 8/2011 | Doyle | |
| 8,046,710 B2 | 10/2011 | Tsuji et al. | |
| 8,060,308 B2 | 11/2011 | Breed | |
| 8,180,502 B2* | 5/2012 | Satoh | G01C 21/3461 701/1 |
| 8,296,062 B2 | 10/2012 | Yamane et al. | |
| 8,406,162 B2 | 3/2013 | Haupt et al. | |
| 2004/0249568 A1 | 12/2004 | Endo et al. | |
| 2005/0071081 A1* | 3/2005 | Hirose | G01C 21/20 701/414 |
| 2005/0240378 A1 | 10/2005 | Smith et al. | |
| 2007/0049260 A1* | 3/2007 | Yuhara | H04L 67/18 455/414.3 |
| 2007/0155404 A1 | 7/2007 | Yamane et al. | |
| 2008/0004789 A1 | 1/2008 | Horvitz et al. | |
| 2008/0030370 A1 | 2/2008 | Doyle | |
| 2008/0133125 A1* | 6/2008 | Nomura | G01C 21/3694 701/423 |
| 2008/0140318 A1 | 6/2008 | Breed | |
| 2009/0143937 A1 | 6/2009 | Craig | |
| 2009/0316671 A1 | 12/2009 | Rolf et al. | |
| 2010/0161222 A1 | 6/2010 | Zhang | |
| 2011/0066361 A1* | 3/2011 | Sumizawa | G08G 1/093 701/118 |

FOREIGN PATENT DOCUMENTS

| | | |
|---|---|---|
| JP | 2000222693 A | 8/2000 |
| JP | 2003130963 A | 5/2003 |
| JP | 2005253070 A | 9/2005 |
| JP | 2009026157 A | 2/2009 |
| JP | 2009237739 A | 10/2009 |
| JP | 2010008095 A | 1/2010 |
| JP | 2010020430 A | 1/2010 |
| WO | 0208922 A1 | 1/2002 |
| WO | 2010040403 A1 | 4/2010 |

* cited by examiner

VEHICLE DATA SYSTEM AND METHOD

CROSS-REFERENCES TO RELATED APPLICATIONS

The present application is a continuation of U.S. patent application Ser. No. 13/884,042, filed on Jul. 22, 2013, which issued as U.S. Pat. No. 9,154,909 on Oct. 6, 2015, which is the National Stage of International Application No. PCT/EP2011/069661 filed on Nov. 8, 2011, and designating the United States, and which claims benefit to United Kingdom Patent Application No. 1018815.9 filed Nov. 8, 2010 and United Kingdom Patent Application No. 1116928.1 filed Sep. 30, 2011. The entire content of these applications is incorporated herein by reference.

FIELD OF THE INVENTION

The present invention relates to a vehicle system and method, for example a system and method for determining at least one weather-related condition.

BACKGROUND TO THE INVENTION

Portable computing devices, for example Portable Navigation Devices (PNDs) that include GPS (Global Positioning System) signal reception and processing functionality are well known and are widely employed as in-car or other vehicle navigation systems. Examples of known PNDs include the GO IIVE 1005 model manufactured and supplied by TomTom International B.V.

The utility of such PNDs is manifested primarily in their ability to determine a route between a first location (usually a start or current location) and a second location (usually a destination). These locations can be input by a user of the device, by any of a wide variety of different methods, for example by postcode, street name and house number, previously stored "well known" destinations (such as famous locations, municipal locations (such as sports grounds or swimming baths) or other points of interest), and favourite or recently visited destinations.

The PND determines the route based upon stored geographical data, usually in the form of a digital map. The stored geographical data can include data concerning a wide variety of features, for example the position and characteristics of roads or other thoroughfares, the position and characteristics of points of interest, and the position and characteristics of geographical features, for example rivers, coastlines, or mountains.

In operation, most PNDs periodically log their own position as a function of time, for example every five seconds. PNDs can also log other, associated data such as speed or direction of travel as a function of time. The data logged by PNDs or other portable computing devices, can be referred to as probe data. It is known to obtain probe data from a large number of PNDs or other portable computing devices, and to process the probe data in order to verify or supplement existing geographical data, for example existing digital maps.

Roads or other routes can be represented in a digital map by separate segments. The digital map can include speed data that represents the expected speed of travel over each segment of a road or other route. Such speed data is obtained from expected average travel speeds over roads of different types or is obtained from probe data representing actual travel of large numbers of vehicles over each road or other route in the digital map.

The speed data can be used in known systems to determine the fastest route to a particular destination, to plan routes and/or to determine an estimated time of arrival (ETAs) at the destination. An example of a system that uses speed data in such a way is the IQ Routes(RTM) system produced by TomTom International B.V.

Whilst speed data can be used to calculate preferred routes and ETAs, the accuracy of such calculations can be hindered due to the unpredictability of traffic. Speed profiles obtained from probe data usually represent long term averages, averaged over periods longer than many types of traffic fluctuations. Local short-lived events or fluctuations of traffic can invalidate, or render inaccurate, a specific speed profile of a road segment. For example, one such event is bad weather, which can easily double ETAs.

Many weather events are local in nature, and are not represented well by typical weather forecast data, which covers large areas with limited accuracy. Many weather-related events, for example ice formation on particular road portions, or the presence of standing water on a road, are local in nature and may be dependent on local geography and road conditions as well as forecast weather conditions. Furthermore, the precise boundary or duration of an area of precipitation or other weather condition may not be represented accurately by weather forecast data.

SUMMARY OF THE INVENTION

In a first aspect of the invention there is provided an apparatus for communicating with a device that is installable in a vehicle, comprising a communications resource for receiving vehicle data from the at least one device, the vehicle data obtained from data provided by at least one sensor, monitoring or control system at the vehicle; and a processing resource operable to obtain weather data and to process the weather data and the vehicle data to determine at least one weather-related condition in dependence on both the weather data and the vehicle data.

By determining of at least one weather-related condition based upon both weather data, for example forecast or actual weather data, and vehicle data, improved accuracy and resolution of the determination of the weather-related condition can be obtained. Information can be obtained using the vehicle data concerning localised weather-related conditions, including road conditions caused by local weather, that is not obtainable from forecast or remotely measured weather data alone, or that is otherwise obtainable only from local permanently installed sensors.

The weather-related data may comprise weather data representative of actual or forecast weather conditions.

The vehicle data may be obtained by processing the data provided the at least one sensor, or monitoring or control system. Alternatively or additionally, the vehicle data may comprise the data provided the at least one sensor, or monitoring or control system.

The processing of the data may be performed as a function of time and/or location.

The processing of the weather data and the vehicle data to determine at least one weather-related condition may comprise amending or verifying the weather data. Thus, greater accuracy or resolution of the weather data may be obtained.

The weather-related condition may comprise a weather condition and/or a condition of a road at at least one location.

The vehicle data may be representative of a property of the behaviour of the vehicle and/or an environmental condition, for example a weather-related condition, at the vehicle.

The processing resource may be configured to apply a statistical model to determine the weather-related condition based on the weather data and the vehicle data, the statistical model representative of relationships between historical vehicle data, historical weather data and historical occurrence of the at least one weather-related condition.

The processing of the weather data and the vehicle data to determine at least one weather-related condition may comprise generating, amending or verifying warning data representative of a weather-related warning.

A weather warning obtained by processing vehicle data and weather data in combination may be of greater accuracy and resolution than that which may be obtained using either vehicle or weather data alone. Some weather-related conditions may be difficult or impossible to determine accurately from either vehicle data or weather-related data alone.

For example, vehicle slip events at a particular location may be from a variety of non-weather related causes, for example oil on the road. However, by processing the slip event data in combination with weather data that indicates, for example near- or below-zero temperatures, the apparatus may determine that it is most likely that the slip events are caused by ice on the road and may, for example, issue a weather-related warning for that location. The accuracy of the determination can be increased by processing the data as a function of time. For example, if an increase in slip events correlates with falling temperatures for the region the probability of the slip event being caused by the ice on the road may increase.

The processing resource may be configured to generate, amend or verify the warning data in dependence on variation of the weather data and/or the vehicle data over a period of time.

The processing resource may be configured to generate, amend or verify the warning data by applying a statistical model representative of relationships between historical variations of vehicle data over a period of time, historical variations of weather data over a period of time and historical occurrence of the at least one weather-related condition.

The warning data may comprise time data representative of the start, end or duration of the weather-related warning, and the processing resource may be configured to monitor the vehicle data and to generate, verify and/or modify the time data in dependence on the vehicle data.

The weather-related data may be representative of a boundary of an area of weather, and the processing resource may be configured to verify and/or modify the location of the boundary in dependence on the vehicle data.

The weather-related data may comprise contour data representative of the boundary of the area of weather, and the processing resource may be configured to modify the contour data in dependence on the vehicle data.

The communications resource may be configured to receive location data representative of the location of the device and/or vehicle and to associate the vehicle data with the location.

The vehicle data may be representative of the driving behaviour of the vehicle. The processing resource may be configured to determine whether the driving behaviour of the vehicle is consistent with the weather-related data.

The vehicle data may be representative of the presence or absence of one or more slip events.

The vehicle data may comprise data obtained from at least one of the following: a rain sensor, a temperature sensor, an acceleration sensor, an angular momentum sensor, a brake sensor, a speed sensor, an ultrasound sensor, a radar sensor, or a sensor or monitoring unit for sensing or monitoring operation of one or more of the following: windscreen wipers, headlamps, sidelights, fog lamps, anti-lock braking system (ABS), air conditioning system, brakes, heating system.

The processing resource may be configured to receive the vehicle data from a plurality of systems installed in a plurality of vehicles.

The processing resource may be configured to perform a statistical analysis of the received vehicle data and/or the weather data. The processing resource may be configured to perform correlation procedures, for example correlating at least two of the vehicle data, the weather data, the location of the vehicles and/or devices, vehicle type, vehicle identifier, device identifier.

The processing resource may be configured to modify the weather data for an area in dependence on the number of vehicles in the area for which the vehicle data is inconsistent with the weather data and/or the proportion of vehicles in the area for which the vehicle data is inconsistent with the weather data. For example, the processing resource may be configured to modify the weather data if the number of vehicles in the area for which the vehicle data is inconsistent with the weather data and/or the proportion of vehicles in the area for which the vehicle data is inconsistent with the weather data is greater than a respective threshold.

The processing resource may be configured to generate or modify a weather-related warning for an area in dependence on vehicle data received from devices installed in at least one vehicle in the area, and to selectively transmit the weather-related warning to further devices in dependence on the location of the further devices, for example to selectively transmit the weather-related warning to further devices present in the area.

The apparatus may comprise a server and/or the device may comprise a mobile device, for example a portable navigation device (PND) or mobile telephone.

In a further aspect of the invention there is provided a device that is installable in a vehicle, comprising: a processing resource for obtaining data from at least one sensor, control or monitoring system installed at the vehicle and processing the data to obtain vehicle data; and a communications resource for providing the vehicle data to a server that is operable to obtain weather data and to process the weather data and the vehicle data to determine at least one weather-related condition in dependence on both the weather data and the vehicle data.

The vehicle data may comprise event data representative of the occurrence or non-occurrence of an event The processing resource or server may be configured to process the data from the at least one sensor, control or monitoring system to determine whether the event has occurred. The processing may comprise comparing the data to a threshold.

The data from the at least one sensor, control or monitoring system may be obtained from at least two different sensor, control or monitoring systems and the processing resource or server may be configured to process the data from the at least two different systems in combination to determine whether the event has occurred The plurality of systems may each provide data that may be processed separately to determine whether an event, for example a slip event, has occurred and the processing resource or server may be configured to process data from the plurality of devices together to determine whether the event has occurred.

The processing resource or server may determine from data from each of the systems separately whether the event has occurred in a plurality of event determination processes, and may then apply at least one rule to combine the results of the event determination processes to determine whether the event has occurred.

The processing resource or server may apply a statistical model to determine from data from the plurality of systems whether the event has occurred, the statistical model may be representative of correlations between historical measurements and occurrence of the event.

Processing the data to determine whether the event has occurred may comprise using a model that correlates data from one of the at least two systems, data from at least one other of the at least two systems, and at least one further parameter, with a determination of whether or not the event has occurred.

The processing resource or server may be configured to obtain further data representative of the at least one further parameter. The at least one further parameter may be representative of a property of the behaviour of the vehicle, for example at least one of angular momentum, linear or centrifugal force, speed, acceleration or deceleration.

The at least two different systems may comprise a dedicated vehicle slip detection system and at least one of an acceleration sensor, an angular momentum sensor, a force sensor, a steering sensor, and a braking sensor.

The event may comprise a slip event.

The event may comprise at least one of: the presence or absence of precipitation, for example rain, snow, sleet or hail; the presence or absence of fog; the presence or absence of ice; the presence or absence of lying snow, the presence or absence of surface water.

The processing resource may be configured to filter the data obtained from the at least one sensor, control or monitoring system and the vehicle data may be representative of the filtered data.

The filtering may comprise comparing the data obtained from the at least one sensor, control or monitoring system to a threshold and, optionally, excluding at least some of the data in dependence on the comparison.

The at least one sensor or monitoring system may comprise at least one of the following: a rain sensor, a temperature sensor, an acceleration sensor, an angular momentum sensor, a brake sensor, an ultrasound sensor, a radar sensor, or a sensor for sensing operation of one or more of the following: windscreen wipers, headlamps, sidelights, fog lamps, anti-lock braking system (ABS), air conditioning system, heating system.

The device may comprise a navigation device, for example a built-in vehicle navigation device.

In a further aspect of the invention there is provided a system comprising an apparatus as claimed or described herein and a device as claimed or described herein.

In another aspect of the invention there is provided a method of communicating with a device that is installable in a vehicle, comprising receiving vehicle data from the at least one device, the vehicle data obtained from data provided by at least one sensor, monitoring or control system at the vehicle; obtaining weather data; and processing the weather data and the vehicle data to determine at least one weather-related condition in dependence on both the weather data and the vehicle data.

The processing of the weather data and the vehicle data to determine at least one weather-related condition may comprise amending or verifying the weather data. The weather-related condition may comprise a weather condition and/or a condition of a road at least one location.

The vehicle data may be representative of a property of the behaviour of the vehicle and/or an environmental condition, for example a weather-related condition, at the vehicle.

The processing of the weather data and the vehicle data to determine at least one weather-related condition may comprise generating, amending or verifying warning data representative of a weather-related warning.

The warning data may comprise time data representative of the start, end or duration of the weather-related warning, and the method may comprise monitoring the vehicle data and to generate, verify and/or modify the time data in dependence on the vehicle data.

The weather-related data may be representative of a boundary of an area of weather, and the method may comprise verifying and/or modifying the location of the boundary in dependence on the vehicle data.

The method may comprise receiving location data representative of the location of the device and/or vehicle and associating the vehicle data with the location.

The vehicle data may be representative of the driving behaviour of the vehicle. The method may comprise determining whether the driving behaviour of the vehicle is consistent with the weather-related data.

The vehicle data may be representative of the presence or absence of one or more slip events.

The vehicle data may comprise data obtained from at least one of the following: a rain sensor, a temperature sensor, an acceleration sensor, an angular momentum sensor, a brake sensor, a speed sensor, an ultrasound sensor, a radar sensor, or a sensor or monitoring unit for sensing or monitoring operation of one or more of the following: windscreen wipers, headlamps, sidelights, fog lamps, anti-lock braking system (ABS), air conditioning system, brakes, heating system.

The method may comprise receiving the vehicle data from a plurality of devices installed in a plurality of vehicles.

The method may comprise modifying the weather data for an area in dependence on the number of vehicles in the area for which the vehicle data is inconsistent with the weather data and/or the proportion of vehicles in the area for which the vehicle data is inconsistent with the weather data. The method may comprise modifying the weather data for an area if the number of vehicles and/or the proportion of vehicles in the area for which the vehicle data is inconsistent with the weather data is greater than a respective threshold The method may comprise generating or modifying a weather-related warning for an area in dependence on vehicle data received from devices installed in at least one vehicle in the area, and selectively transmitting the weather-related warning to further devices in dependence on the location of the further devices, for example selectively transmitting the weather-related warning to further devices present in the area.

In a further aspect of the invention there is provided a method comprising obtaining data from at least one sensor, control or monitoring system installed at the vehicle and processing the data to obtain vehicle data; and providing the vehicle data to a server that is operable to obtain weather data and to process the weather data and the vehicle data to determine at least one weather-related condition in dependence on both the weather data and the vehicle data.

The vehicle data may comprise event data representative of the occurrence or non-occurrence of an event The data from the at least one sensor, control or monitoring system may be obtained from at least two different sensor, control or monitoring systems and the method may comprise processing the data from the at least two different systems in combination to determine whether the event has occurred The method may comprise applying a statistical test to the data.

The method may comprise using a model that correlates data from one of the at least two systems, data from at least one other of the at least two systems, and at least one further parameter, with a determination of whether or not the event has occurred.

The at least two different systems may comprise a dedicated vehicle slip detection system and at least one of an acceleration sensor, an angular momentum sensor, a force sensor, a steering sensor, and a braking sensor. The event may comprise a slip event.

The event may comprise at least one of: the presence or absence of precipitation, for example rain, snow, sleet or hail; the presence or absence of fog; the presence or absence of ice; the presence or absence of lying snow, the presence or absence of surface water.

The method may comprise filtering the data obtained from the at least one sensor, control or monitoring system and the vehicle data may be representative of the filtered data.

The filtering may comprise comparing the data obtained from the at least one sensor, control or monitoring system to a threshold and, optionally, excluding at least some of the data in dependence on the comparison.

The at least one sensor or monitoring system may comprise at least one of the following: a rain sensor, a temperature sensor, an acceleration sensor, an angular momentum sensor, a brake sensor, an ultrasound sensor, a radar sensor, or a sensor for sensing operation of one or more of the following: windscreen wipers, headlamps, sidelights, fog lamps, anti-lock braking system (ABS), air conditioning system, heating system.

In a further aspect of the invention there is provided a computer program product comprising computer readable instructions that are executable by a computer to perform a method as claimed or described herein.

There may also be provided an apparatus or method substantially as described herein with reference to the accompanying drawings.

Any feature or aspect of the invention may be combined with any other feature or aspect of the invention, in any appropriate combination. Apparatus features may be applied as method features and vice versa.

DETAILED DESCRIPTION OF EMBODIMENTS

Embodiments of the invention are now described, by way of non-limiting example, and are illustrated in the following figures, in which.

Figure 1:
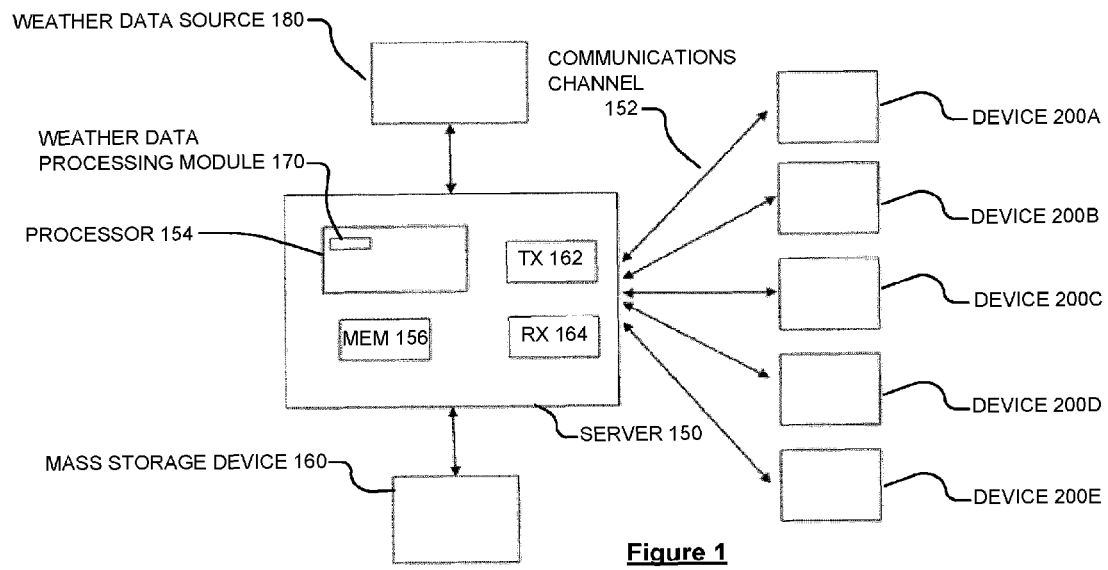
FIG. 1 is a schematic illustration of a navigation system according to an embodiment.

A system for obtaining data from mobile devices and for determining a weather-related condition, for example verifying or modifying weather data, using the obtained data is illustrated in FIG. 1. The system comprises a server 150 that is operable to communicate with a plurality of portable devices, for example PNDs 200a to 200e. Only five devices 200a to 200e are shown for clarity, but it will be understood that in practice many thousands, or more, devices may be in communication with the server 150.

In the embodiment of FIG. 1 the devices 200a to 200e are vehicle-mounted PNDs, that use Global Positioning System (GPS) technology to determine their positions, and that are able to perform navigation or mapping operations. The devices 200a to 200e are not limited to being PNDs and may be any suitable type of device with navigation functionality, for example a mobile phone or portable computer.

The server 150 includes a processor 154 operatively connected to a memory 156. In operation, software stored in server memory 156 is read by the processor 154 to load software modules or other software components that enable the processor 154, to perform various processing or communication functions. In the embodiment of FIG. 1, the software modules comprise a weather data processing module 170. The operation of the weather data processing module will be described in more detail below.

The server 150 is further operatively connected to a mass data storage device 160. The mass storage device 160 contains a store of navigation data, and can again be a separate device from the server 150 or can be incorporated into the server 150. The mass data storage device 160 can be used to store probe data from the devices 200a to 200e.

The server 150 is also in operative communication with at least one source of weather data 180, for example a third party website or weather communication centre that provides a dedicated weather feed. The at least one source of weather data can, alternatively or additionally, comprise weather sensor(s), rain radar(s) or a computer performing model calculations. The server 150 communicates with the at least one source of weather data via any suitable communications channel, for example via Internet connection or via a dedicated wired or wireless connection.

The server 150 is able to collect and fuse localized, accurate weather information (including but not limited to current/forecast information on precipitation, temperature, wind condition, and regional severe-weather warnings like storm or road ice, etc.) from multiple sources if desired.

The processor 154 is operable to transmit and receive information to and from devices 200a to 200e via communications channel 152, for example via transmitter 162 and receiver 164. The signals sent and received may include data and/or other propagated signals. The transmitter 162 and receiver 164 may be selected or designed according to the communications requirement and communication technology used in the communication design for the navigation system. Further, it should be noted that the functions of the transmitter 162 and receiver 164 may be combined into a single transceiver.

In the normal course of operation of the navigation devices 200a to 200e, GPS data from the devices are regularly recorded (for example, each 5 seconds for some systems) as probe data on a logging device, for example in the form of a data logger module included on the portable navigation devices themselves.

As well as receiving and processing probe data received from the devices 200a to 200e, the server 150 can also provide data to the devices 200*a* to 200*e*, for example in the form of digital map data (for example, digital map data updated in view of received probe data), software upgrades, or traffic or other updates.

Although the communication channel 152 of the embodiment of FIG. 1 may comprise an internet connection, any suitable form of data channel can be used. The communication channel 152 is not limited to a particular communication technology. The channel 152 may include several communication links that use a variety of technology. For example, the communication channel 152 can be adapted to provide a path for electrical, optical, and/or electromagnetic communications. As such, the communication channel 152 includes, but is not limited to, one or a combination of the following: electric circuits, electrical conductors such as wires and coaxial cables, fibre optic cables, converters, radio-frequency (RF) waves, the atmosphere, or free space. Furthermore, the communication channel 152 can include intermediate devices such as routers, repeaters, buffers, transmitters, and receivers, for example.

In one illustrative arrangement, the communication channel 152 includes telephone and computer networks. Furthermore, the communication channel 152 may be capable of accommodating wireless communication, for example, infrared communications, radio frequency communications, such as microwave frequency communications. Alternatively or additionally, the communication channel 152 can accommodate satellite communication.

The communication signals transmitted through the communication channel 152 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), or Global System for Mobile Communications (GSM). Both digital and analogue signals can be transmitted through the communication channel 152. These signals may be modulated, encrypted and/or compressed.

Figure 2:
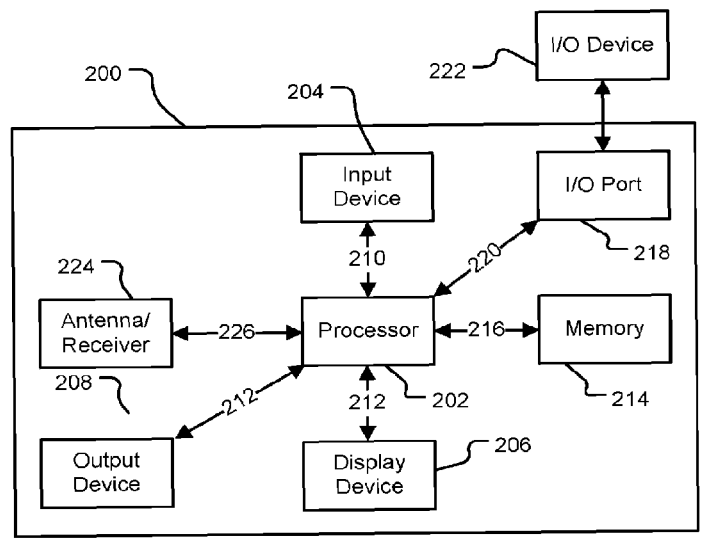
FIG. 2 is a schematic illustration of a navigation device according to an embodiment.

A navigation device 200 in one embodiment is illustrated in FIG. 2. It should be noted that the block diagram of the navigation device 200 is not inclusive of all components of the navigation device, but is only representative of many example components. The navigation device 200 is located within a housing (not shown). The navigation device 200 includes a processing resource comprising a processor 202, the processor 202 being coupled to an input device 204 and a display device, for example a display screen 206. Although reference is made here to the input device 204 in the singular, the skilled person should appreciate that the input device 204 represents any number of input devices, including a keyboard device, voice input device, touch panel and/or any other known input device utilised to input information. Likewise, the display screen 206 can include any type of display screen such as a Liquid Crystal Display (LCD), for example.

In one arrangement, the touch panel, and the display screen 206 are integrated so as to provide an integrated input and display device, including a touchpad or touchscreen input to enable both input of information (via direct input, menu selection, etc.) and display of information through the touch panel screen so that a user need only touch a portion of the display screen 206 to select one of a plurality of display choices or to activate one of a plurality of virtual or "soft" buttons. In this respect, the processor 202 supports a Graphical User Interface (GUI) that operates in conjunction with the touchscreen.

In the navigation device 200, the processor 202 is operatively connected to and capable of receiving input information from input device 204 via a connection 210, and operatively connected to at least one of the display screen 206 and the output device 208, via respective output connections 212, to output information thereto. The navigation device 200 may include an output device 208, for example an audible output device (e.g. a loudspeaker). As the output device 208 can produce audible information for a user of the navigation device 200, it should equally be understood that input device 204 can include a microphone and software for receiving input voice commands as well. Further, the navigation device 200 can also include any additional input device 204 and/or any additional output device, such as audio input/output devices for example.

The processor 202 is operatively connected to memory 214 via connection 216 and is further adapted to receive/send information from/to input/output (I/O) ports 218 via connection 220, wherein the I/O port 218 is connectible to an I/O device 222 external to the navigation device 200. The external I/O device 222 may include, but is not limited to, an external listening device, such as an earpiece for example. The connection to I/O device 222 can further be a wired or wireless connection to any other external device such as a car stereo unit for hands-free operation and/or for voice activated operation for example, for connection to an earpiece or headphones, and/or for connection to a mobile telephone for example, wherein the mobile telephone connection can be used to establish a data connection between the navigation device 200 and the Internet or any other network for example, and/or to establish a connection to a server via the Internet or some other network for example.

Figure 3:
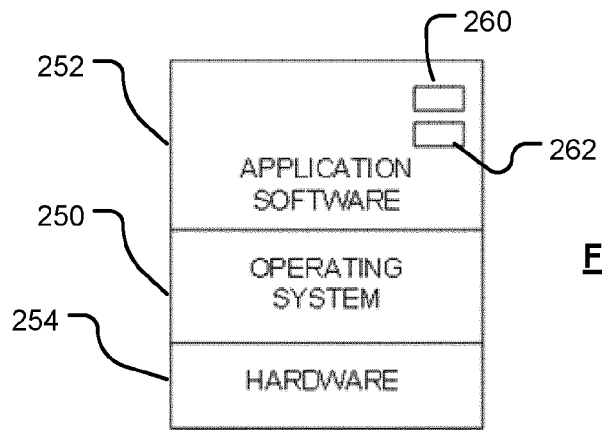
FIG. 3 is a schematic illustration of a processing resource of FIG. 2.

Referring now to FIG. 3 of the accompanying drawings, internal flash memory (not shown) of the device 200 stores a boot loader program that is executable by the processor 202 in order to load an operating system 250 and application software 252 from the storage device 214 for execution by functional hardware components 254, which provides an environment in which the application software 252 can run. The operating system 250 serves to control the functional hardware components and resides between the application software 252 and the functional hardware components 254.

The application software 252 provides an operational environment including a GUI that supports core functions of the navigation device 200, for example map viewing, route planning, navigation functions and any other functions associated therewith. The application software 252 is able to plan routes and determine the expected time of arrival at a destination based on expected speed of travel for each segment of a route, using known techniques. The expected speed of travel for each segment of road or other thoroughfare of a digital map can be stored as speed data in the device 200 and accessed when required. The speed data can be updated via speed data updates from the server 150. The application software 252 includes a data processing module 260 for receiving and processing data representative of measurements performed by at least one sensor, thereby to obtain sensor-derived data, and a data logging module 262. The operation of the processing module 260 and the data logging module 262 is described in more detail below.

The navigation device 200 can be docked to a docking station located in a vehicle. For example the navigation device 200 may sit on an arm which itself may be secured to a vehicle dashboard or window using, for example, a suction cup.

Figure 4:
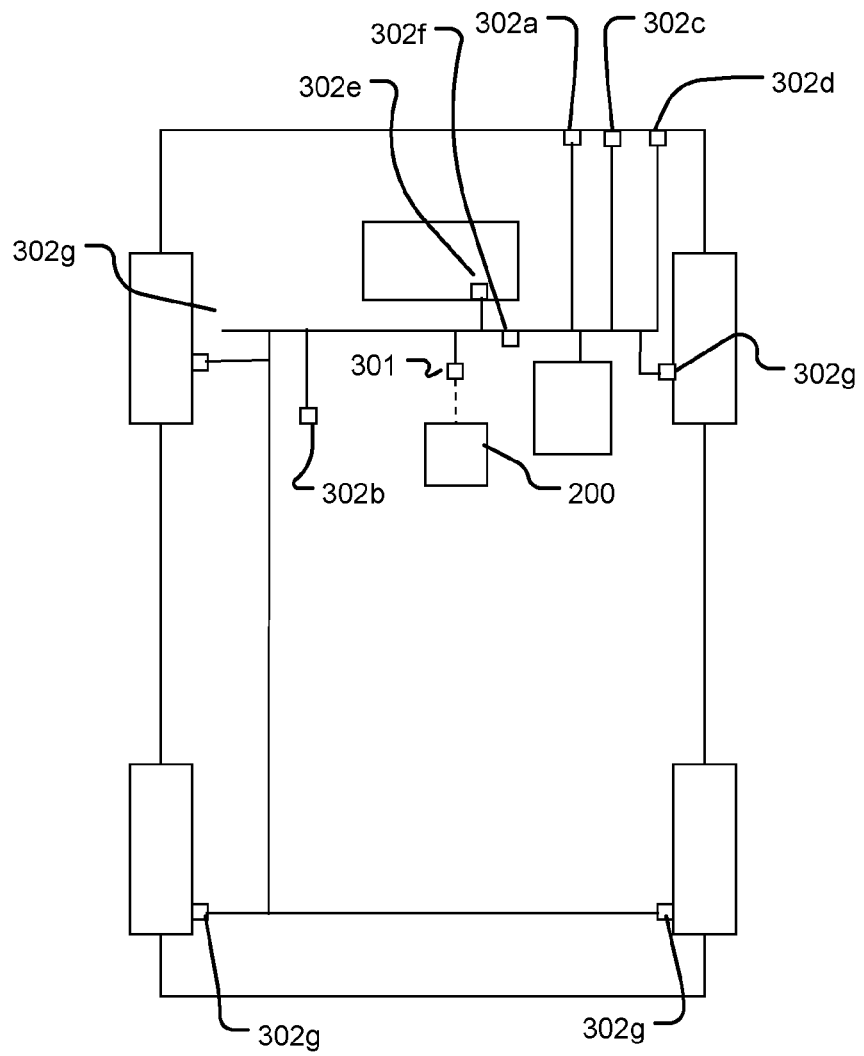
FIG. 4 is a schematic diagram showing various control, monitoring or sensor modules of a vehicle in which the navigation device of FIG. 2 is installed.

Referring to FIG. 4, when docked in-vehicle, the navigation device 200 is operable to communicate with at least one electronic data bus 300 of the vehicle. The navigation device 200 may communicate with the bus 300 by means of an interface unit 301, either via a direct connection at the docking station, or via a wireless connection. For example, the interface unit 301 may comprise a wireless interface (for example a Bluetooth interface) of the vehicle.

The data bus 300 carries signals between different sensor modules 302 and control or monitoring modules 304 of the vehicle, allowing the different modules to communicate. The modules 302, 304 may form part of the vehicle's systems for controlling or monitoring operation of the vehicle.

Examples of control or monitoring modules include an engine control unit (ECU) 304a, a traction control module 304b, a suspension and stability control module 304c, a headlamp control module 304d, a windscreen wiper control module 304e, a foglamp module 304f, an anti-lock braking system module 304g, a transmission control module 304h, a braking module 304i, a climate control module 304j. Examples of sensor modules include a rainfall sensor 302a, a steering position sensor 302b, a light sensor 302c, an external ambient temperature sensor 302d, one or more transmission and engine performance sensors 302e, at least one angular momentum sensor module 302f, one or more vehicle speed sensors 302g, a radar module 302h, and an ultrasound module 302i. It will be understood that a particular vehicle can have any combination of control, monitoring and/or sensor modules. Alternatively or additionally, a vehicle may include different control, monitoring and/or sensor modules for measuring any suitable aspect of the vehicle's status or performance or any suitable environmental condition to which the vehicle is subject.

The data bus 300 enables information transfer between different modules and interrogation or receipt of information from the modules. The data bus 300 may operate according to an established data bus protocol, such as the Controller Area Network bus (CAN-bus) protocol that is widely used in the automotive industry for implementing a distributed communications network.

One or more of the sensor modules 302 may, as an alternative to, or in addition to, communicating via the bus 300, communicate with a respective control module 304 via a dedicated direct connection (not shown). Such a direct connection may be used, for example, where a continuous signal from the centre is required by the control module, or where the signal is required is to be transmitted over a secure data path. Not all sensor signals may be available from the bus 300, but the data used by the present embodiment is generally obtainable directly, or indirectly, via bus 300 and/or the interface unit 301.

In alternative embodiments the vehicle is equipped with extended floating car data (xFCD) functionality, and an xFCD interface is provided, as well as or instead of device 200. The xFCD interface may be a dedicated interface provided as an integral part of the vehicle by the manufacturer. In such alternative embodiments, data from the various modules 302, 304 may transmitted to the server 150 directly by the xFCD interface together with the current position of the vehicle. Alternatively the device 200 may include an xFCD interface that can be used to communicate with, and obtain data from, the vehicle's xFCD interface.

When a user switches on the navigation device 200, the device 200 acquires a GPS fix and calculates (in a known manner) the current location of the navigation device 200. The user is then presented with a display showing in pseudo three-dimensions the local environment in which the navigation device 200 is determined to be located, and in a region of the display below the local environment a series of control and status messages.

By touching the display of the local environment, the navigation device 200 switches to display a series of virtual or soft buttons represented by icons by means of which a user can input a destination to which they wish to navigate, and perform various other functions relating to control of the navigation device 200 or display of data on the display.

It is a feature of the embodiment that during operation of the navigation device 200 and, for example, the operation of the vehicle, data from the sensor, control or monitoring modules 302, 304 is obtained and processed by the device 200 to obtain vehicle data, for example status data or sensor-derived data, that is then transmitted to the server 150. The vehicle data can comprise event data representative of an event. The server 150 uses the received vehicle data, which may be received from a large number of devices, to determine at least one weather-related condition, for example to verify or modify weather data or to verify, modify or generate weather warnings. The system is thus able to take into account measurements or behaviour of individual vehicles that can provide weather-related information of greater accuracy or resolution than that obtained from weather forecasts.

The operation of the server to take into account the vehicle data will be described in more detail below. Firstly, the processing and logging of data by a single device 200 installed in a vehicle will be described.

Figure 5:
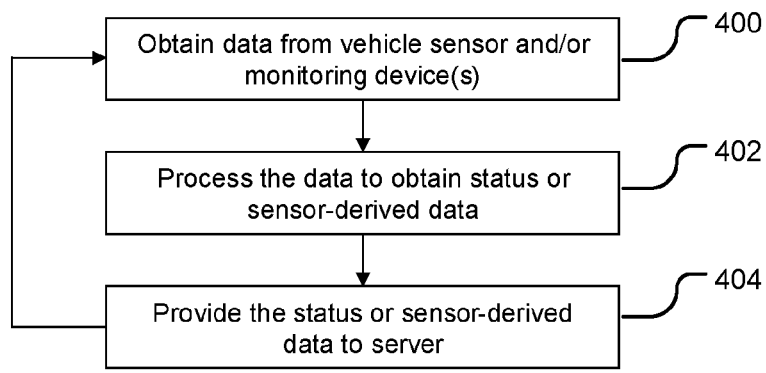
FIG. 5 is a flowchart illustrating in overview the processing of control, monitoring or sensor data by the device of FIG. 2 at the vehicle.

FIG. 5 is a flow chart illustrating one mode of operation of the embodiment of FIGS. 1, 2 and 4.

A feature of the embodiment is that data obtained from sensor, control or monitoring systems provided at a vehicle, for example one or more of the modules 302, 304, during normal operation of the vehicle can be used to measure, or infer knowledge about, local weather conditions. Thus, the processing module 260 of the processing resource of the PND 200 monitors data received from one or more of the modules 302, 304, as indicated at stage 400 of FIG. 5.

Any of a wide range of different parameters, obtained from different in-vehicle sensor, control or monitoring system can be used to determine information concerning local weather conditions even though, the sensor, control or monitoring systems may not be intended for that purpose.

In the mode of operation of FIG. 5, the processing module 260 monitors data received from, for example, gyroscopes and accelerometers and wheel speed from all wheels. At stage 402 of the process the processing module 260 processes the received data to determine whether inconsistencies between the sensors must be flagged as wheel slip. Inconsistencies are determined on the basis of kinetic and dynamic models of the car. Certain types of (simple) slip can be determined from wheel speed inconsistencies alone. Sideways components require a gyroscope, kinetic models and ideally (possibly indirect) force measurement.

In the embodiment of FIG. 5 a slip scale is defined that maps slip events to a road slip condition (or adhesion condition). For all practically relevant cases the road condition measure can be expressed in a single number, for example on a scale between 0 and 1, where 0 represents the extreme case of zero friction force against the vehicle wheels and 1 represents the other extreme case of an ideally dry surface. For the present purpose the effect of different types of wheels, different types of road surfaces (if not too extreme), different pressures per road contact area, and differences between adhesive friction and dynamic friction (assuming they differ by less than approximately a factor of two) can be ignored in practice, as we are only concerned with the car dependent slip scale near zero.

The processing module 260 processes the GPS data, angular momentum data and/or speed data and determines a slip value according to the slip scale. The slip scale may be calibrated against a large number of previously performed measurements using a test vehicle.

At the next stage 404, the logging module 262 stores the calculated slip value together with location data representative of the location of the device 200 (and thus also the location of the vehicle) at that time. The slip value can provide an indication of weather conditions, for example the presence of ice or standing water on a road.

In a variant of the embodiment, the processing module 260 compares the slip value to a threshold and determines binary slip data indicating slip or no slip based on the comparison. In that case the binary slip data rather than the slip value is stored by the logging module 262.

The reading, processing and storage of the data at stages 400 to 404 is repeated periodically, for example every five seconds. The logged data is subsequently transmitted to the server 150. The data may be transmitted periodically, for example every 5 minutes, via a wireless connection, or may be transmitted when the device 200 is removed from the vehicle and connected to the Internet for example via a docking station connected to a PC in which case the data is used for a posteriori statistical analysis. An event-based transmission approach can also be used, in which data is transmitted only whenever the data (following any filtering processes, for example) seems to represent a potential event of interest. In some cases, only data representative of a slip event is transmitted to the server 150, in response to such a slip event being detected, which reduces the amount of data to be transmitted.

FIG. 5 is described in relation to the monitoring and storage of data that relates to slip events. In alternative embodiments, any suitable data from vehicle sensors or other devices can be processed and stored if the data is representative of, or can be used to determine, a weather-related parameter.

For example, in alternative embodiments or modes of operation, the module 260 receives data from one or more of a windscreen wiper module 304a, a rain sensor 302a, a light sensor 302c, a temperature sensor 302d, a headlamp control module 304d, a braking module 304i, a fog lamp control module 304f, a radar module 302h or an ultrasound module 302i. The received data stream is processed by the module 260 and logged by the logging module 262.

In some cases the processing by the module 260 comprises merely forwarding the data to the logging module 262. In other cases additional processing is performed by the module 260. For example, the module 260 can process the data to determine whether a particular event has occurred, and the logging module 262 then stores event data representative of the occurrence or non-occurrence of the event. For example, the module 260 may monitor the temperature and generate low-temperature event data if the average temperature is below 0° C., or some other threshold value, for at least a predetermined period of time (for example, 1 minute). In another example, the module 260 may monitor windscreen wiper activity and generate rain event data if the windscreen wipers are active for greater than a threshold portion of time (for example, 75% during a predetermined period (for example 1 minute). The event data, or other status or sensor-derived data, is stored by the logging module 262 for subsequent transmission to the server 150.

The logging module 262 also stores location data representative of the location of the vehicle at the time the vehicle data was obtained, and associates the location data with the vehicle data. The location data is also transmitted to the server 150. In many embodiments, several different types of vehicle data, which may include for example speed data, are logged together with location data and provided to the server 150.

In order to reduce data transfer requirements, intelligent filtering of data and events can be implemented directly on the device, for example by the module 260 either before or after logging of the data and events. Such filtering can prevent, for example, common events such as normal brake application or slipping of wheels during particularly strong acceleration from being transferred.

Different filtering processes may target different types of events, for example slippery road, rainfall, obstacles in the road, dense traffic.

In the case where we are only interested in slip events that are due to slippery road conditions, the purpose of the filtering is to suppress slip events that can be explained simply as originating from other causes, for example strong acceleration or braking, and are thus not necessarily indicative of slippery roads. Examples of filtering processes associated with various different events (not only slippery road conditions) are described in the following paragraph.

One filtering process comprises applying an angular momentum filter to detect slip events that are associated with low linear acceleration, or operation of the accelerator pedal below a predetermined level, thus indicating true slip due to road or other conditions rather than due to excessive acceleration. Another filtering process comprises using an angular momentum analyser to detect events for which high acceleration or deceleration is consistent with measured angular momentum which indicates a normal road condition. A further filtering process comprises correlating current position, digital map data and acceleration or deceleration data to filter out plausible acceleration or deceleration at stoplights or right-of-way crossings (for the latter, only acceleration is plausible as a standard non-remarkable traffic scenario). Another filtering process comprises correlating measurements from an ultrasound distance sensor with braking events to determine whether the braking events are associated with the presence of an obstacle. Further filtering processes comprise correlating operation of an external water sensor, application of cleaning fluid and operation of windscreen wipers, which can identify wiper activity and/or the detected presence of water that is due to application of cleaning fluid rather than rainfall.

As discussed above in relation to the detection of slip events, the module 260 is operable to determine the occurrence or non-occurrence of an event based on data received from one or more sensors or control or monitoring modules. In some vehicles, the manufacturer includes systems that automatically determine whether or not a particular event has occurred, and event signals representative of the occurrence of such an event can be read from the CAN bus. For example, some manufacturers include slip detection systems that allow the readout of event signals representative of slip events from the CAN bus.

The manufacturer's slip detection system for a given vehicle is based on an interpretation or threshold representative of when slip occurs or does not occur. It can be useful to use data from the manufacturer's slip detection system because the detection system may deliver valuable information. The manufacturer is aware of the vehicle's dynamic properties and is able to install advanced sensory systems such as direct force or angular momentum sensors in locations that are only accessible to the manufacturer. As the manufacturer systems are based on a manufacturer specific calibration, it is a feature of some embodiments that the module 260 of the device 200 combines the output from the manufacturer's dedicated slip detection system with outputs from other sensors or devices in order to verify or calibrate the data from the dedicated slip detection system.

The manufacturer's slip detection system can contribute to overall improved calibrated measurement of road slickness if it delivers suitable interpretable information that is representative of or can be interpreted to determine force of the vehicle against the road in a direction parallel to the road surface.

An example of a particularly useful dedicated slip detection system is one that issues force or angular momentum data at regular intervals (for example, intervals of the order of milliseconds) and outputs data indicating slip/no slip instantaneously, possibly together with slip distance. Another useful system is one that issues a single slip event signal together with slip distance and (minimum) force or angular momentum data after the slip event. Both of the systems may output the indicated data only below a certain force or angular momentum threshold and distance threshold, so that apparent slip events caused by extreme driver behaviour are ignored.

Another example of a useful dedicated slip detection system is one that issues at regular distance intervals (for example each kilometre) a numeric value that comprises several measurements which represent slip events or slowly accumulated (via many small or continuous slips) heading inconsistencies, or one that outputs a signal whenever the ABS is activated and preferably also delivers angular momentum information. It should be noted that sideways slip or spin cannot generally be determined from the ABS system alone but is detected by looking for dynamic inconsistencies. Each of the dedicated slip detection systems is most useful in the present context if it provides data relating to each wheel separately.

As mentioned, the output from the manufacturer's dedicated slip detection system can be processed in combination with the outputs from other systems, for example force or angular momentum data, GPS data and speed data, in order to determine reliably whether or not a slip event has occurred in accordance with a predetermined, calibrated scale. Three different approaches for combining the data from the different systems are now described. The systems are referred to as system A (for example, the manufacturer's dedicated slip detection system) and system B (for example, module 260 determining slip or no slip from other sensor or control system data obtained via the CAN bus).

In the first approach each of the two systems, A and B, produces binary results (slip/no slip), possibly with a non-trivial joint probability density. A simple logic AND operation would be the most direct approach to combine data from the two sources, with a slip event being determined by the module 260 to occur only if both systems A and B indicated a slip event. However, that would assume that the results from system A and system B are jointly independent with an equal probability of false-positive and false-negative under all circumstances. That assumption is unlikely to be correct in practice for most cases. There are four ideal cases which allow perfect detection:

system A is always right (specificity and sensitivity=1)
system B is always right (specificity and sensitivity=1)
system A is never wrong when detecting slip and system B is never wrong when detecting no-slip
system B is never wrong when detecting slip and system A is never wrong when detecting no-slip, and two possible intermediate cases:

system A is almost never wrong when detecting slip, and system B is almost never wrong when detecting no-slip
system B is almost never wrong when detecting slip, and system A is almost never wrong when detecting no-slip.

In practice, one can shift seamlessly between all four cases depending on the vehicle and systems in question. For a particular type of vehicle and types of systems, calibration procedures are performed using a test vehicle. If possible, hardware/software used in the tests measures data for all realistic and relevant slip (and near slip) scenarios to determine the individual behaviour and possible joint probability for the outcomes of both systems A and B. A model derived from the calibration data obtained from the tests is subsequently provided to and stored at the device 200. Theoretically the situation can be complicated since the error behaviour will be dependent on the slip scenario.

In a complex case the measured parameters are magnitude of force, speed, current curvature and centrifugal force, and also the type of slip, for example straight or sideways or both, slip due to acceleration, slip due to breaking. The combination of the output from the two systems A and B to determine a decider of whether there is slip or no slip is a function of a multidimensional parameter vector space in which each point in the space can be represented by sensitivity-specificity-table, as represented in Table 1.

TABLE 1

Decider as a function of system A, system B, scenario parameters

| | | Condition | |
| --- | --- | --- | --- |
| | | Positive | Negative |
| Outcome | Positive | True positive | False positive (TFP) |
| | Negative | False negative (TFN) | True negative |

In practice, the final parameter space is likely to contain only a few variables and few intervals per variable resulting in a reasonable number of sensitivity-specificity-tables. The choice of the threshold parameters below which the decider gives an inconclusive result as to whether there has been a slip or not (which in itself represents valuable information) can be determined based upon operator preferences, and risk management criteria. In general, in this context, the potential damage caused by a false-negative "no-slip" outcome is greater than a false-positive "slip" outcome.

The second approach to determining whether there has been a slip or no slip based on data from system A and system B uses a continuous measurement and weighted decision process. A suitable parameter for use in a threshold-based binary decision process (slip or no slip) is the (road-parallel) force necessary to make the wheel slip. This is particularly useful, since such force can be represented by a single number and is a physical quantity which allows model interpretations if necessary. In practice, we use a reasonable threshold of slip distance per wheel that is sufficiently far above the noise level and which reflects the common understanding of slip. This approach requires that the output from the manufacturer's dedicated slip detection system comprises or can be used to determine the (road-parallel) force.

If it is assumed that the two road-parallel force detection systems (system A and system B) are technically equivalent and deliver equal expectation values but are noisy with jointly independent and uncorrelated noise, then the value that comes most likely closest and unbiased to the true value is estimated by:

$$f = \frac{1}{2}(f_A + f_B)$$

where $f_A$ and $f_B$ are the values measured by the two systems A and B. This assumption is unlikely to be entirely correct in practice. The statistical properties of measurements $f_A$ and $f_B$ are likely to depend on the aforementioned parameter vector (slip scenario). For example, at low force and high curvature system A may overestimate the true value drastically but with high statistical accuracy (i.e. reproducibility) or deliver an unbiased expectation value but with high statistical spread. In practice we assume here that we are dealing with the second case.

For a particular type of vehicle and types of systems, calibration procedures are performed using a test vehicle. Hardware/software used in the tests measures data for all realistic and relevant slip (and near slip) scenarios a suitable number of times. This number depends on the statistical spread of the force values $f_A$ and $f_B$ and the ratio of correct and incorrect decisions as to whether there has been slip or no slip. The number of times, N, the scenarios are repeated depends on the required statistical accuracy 1/sqrt(N), where N is the number of the most rare event. The subsequent analysis associates weighting factors a and b with each system:

$$f = \frac{1}{a+b}(a*f_A + b*f_B)$$

where a and b are functions of the aforementioned parameter space, comprising, for example, the parameters of force, curvature, speed, level of breaking/accelerating and any other suitable parameters.

As in the first approach, the final parameter space is likely to contain only a few variables and few intervals per variable. In the case of highly unreliable data (high statistical spread) from both systems (low a and b) the decider may give an outcome of "inconclusive" rather than slip or no slip, which in itself represents valuable information.

Each system, A and B, provides event data representative of slip or no slip, together with a measured (or estimated) value of force $f_A$ or $f_B$. The reliability of the slip/no slip event data can be determined using the values of force, $f_A$ and $f_B$, and the stored values of a and b.

Subsequent slip events or a long slip event can provide a series of estimated measured forces at different times. The consistency of the slip threshold force from one slip event to the next can be used in determining the overall reliability of the current road condition measurement of that particular car.

Calibration data representative of values of a and b as a function of the parameters of the parameter space determined from the tests is subsequently provided to and stored at the device 200. In operation, event data representative of slip or no slip, and a measured (or estimated) value of force $f_A$ or $f_B$ is obtained from each of systems A and B. The module 260 determines whether there has been a slip, no slip, or provides an inconclusive result based on the data, using the model.

In a third approach, a fused classification using general statistical methods is employed. In that approach, based on the binary decisions (slip or no slip) of the single systems A and B, the force values $f_A$ & $f_B$, the respective standard deviations of the force values, $Df_A$ and $Df_B$, over a given period of time, and the additional available parameters (for example, but not limited, to curvature, centrifugal force, speed, breaking/accelerating), the probability that a slip event detected by either system A or B is a true slip event can be modelled using general statistical algorithms and methods including but not limited to multi-dimensional linear classifiers, multi-dimensional linear discriminants, support-vector machines, neural networks, clustering algorithms based on expectation-maximization, or decision trees.

In a similar method to those employed in the first two approaches, the statistical algorithms and methods can be used to fuse the decisions of systems A and B in a meaningful way in order to minimize the probability of misclassification of slip conditions for all events individually, aiming for more robust classification than is possible with each system separately. On the one hand, more sophisticated general approaches of the types listed above in principle make fewer simplifying assumptions, require less prior knowledge, and have the potential to provide a better classification performance than the first two approaches. On the other hand, they rely more heavily on a sufficient amount of available training data derived from calibration measurements performed using a test vehicle, such as those described above, and may also require more elaborate software functionality at the device 200.

In a hybrid approach, the weighting functions a and b used in the second approach are determined using statistical modelling approaches of the kind listed in relation to the third approach. That can reduce the complexity of the required statistical analysis and the generated models, simplify the functionality on the device, and mitigate the dependency on comprehensive calibration data.

The calibration required for each of the three approaches, can be carried out in an automated fashion using a computerized driver that goes through all desired scenarios of breaking, accelerating, at different speeds, curvatures or values of other parameters. The collected data is saved into a data structure that corresponds to a multidimensional parameter space. At least one, and possibly multiple, fusion/combination models and associated calibration data that fuse or combine data from systems A and B in accordance with one or more of the described approaches are stored at the device 200. In some embodiments, multiple models and sets of calibration data are stored at the device 200, the different models being specific to the devices from different manufacturers. In some such embodiments the device 200 automatically detects the manufacturer of the connected car (or local slip detection functionality) and chooses the appropriate model. In cases where no calibration measurements and model generation have been performed for the detected vehicle or systems, a simpler default model is used.

Once the module 260 has determined whether or not there has been a slip event based on data from the two systems, A and B, it generates slip event data representative of whether or not there has been a slip. The slip event data is logged by the data logging module 262 and subsequently provided to the server 150, as already described.

Although the combination of data from different sources has been described in relation to slip detection systems, the approaches that have been described can be used to combine data from any suitable sources, for example any suitable sensors or event detection systems.

Figure 6:
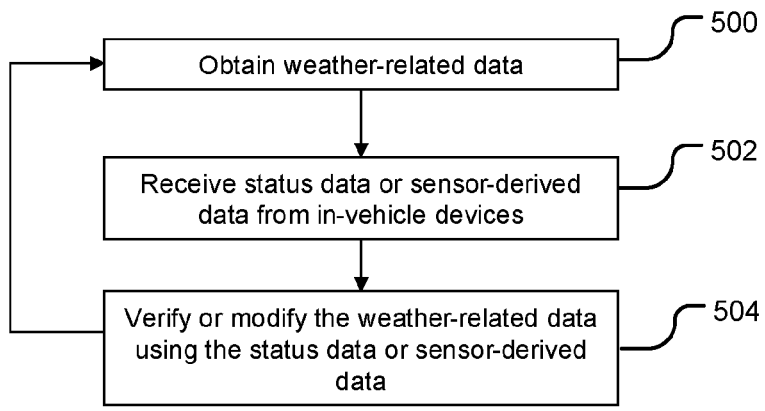
FIG. 6 is a flowchart illustrating in overview the processing of weather data at a server of the system of FIG. 1.

As described above, the device 200 provides status or sensor derived data to the server 150. The server 150 uses the received data to determine at least one weather-related condition, for example to verify or modify weather data, as will now be described, with reference to the flowchart provided in FIG. 6.

At the first stage of the process the server 150 receives weather-related data, for example weather data from the weather data source 180.

In one mode of operation the server 150 receives current weather data from the weather data source 180 on a regular basis, for example every 15 minutes. The current weather data usually comprises a set of weather data comprising the most recent measured weather data and sets of forecast weather data representing forecast weather conditions for times in the future, for example at 15 minute intervals for three hours in the future.

Each set of weather data may comprise a plurality of data points, each data point representing a weather condition (for example rainfall level) at a respective location in a region. In some case, the data points may correspond to regularly spaced positions across the region. In some embodiments, the weather data is in the form of text data or XML data, although any suitable data format can be used. In some cases, the set of weather data comprises or is used to generate a frame of weather data that can be used to display an image representing the weather condition for the region at a particular time.

In some modes of operation the server 150 may receive a plurality of sets of weather data each representing a different weather condition (for example rainfall, temperature, wind speed) at one particular time.

The server 150 also receives, at stage 502, vehicle data from in-vehicle devices, such as PND 200 as already described. The server 150 usually receives the data from a large number of devices, for example a large number of PNDs.

The weather data processing module 170 correlates the position-dependent vehicle data with the received position-dependent weather data thereby to verify or amend the weather data. Thus, information from uncertain external sources can be verified or amended, and weather warnings can be generated, amended and/or made more closely focused on particular areas. Fusion of the weather data with local vehicle data can be used to validate information from sources within inherently limited reliability and to greatly improve the localisation of weather conditions, for example heavy rain and road ice, that can otherwise only be localised to a similar degree where roads are equipped with corresponding sensors.

As has been discussed, a large number of different types of status or sensor derived data can be provided by the devices, for example device 200. The processing of the data and the correlation or other statistical procedure performed by the module 170, can vary in dependence on the particular type of data and the application in question.

In one mode of operation, the weather data processing module 170 determines as a function of location and time the amount of windshield wiper activity, rain sensor data and headlight activation during daylight hours, as represented by status or sensor derived data received from a large number of in vehicle devices. If the amount of windshield wiper activity, rain sensor data and/or headlight activation for a particular location and time interval suggests that there is precipitation, for example rainfall, for example based upon a model (that may also represent various other environmental or traffic parameters) then the module determines that there is precipitation, for example rainfall, at that location and time based upon the model. The model, in a simple case, may merely comprise a comparison of windshield wiper activity, rain sensor data and headlight activation to a threshold value.

The module 170 then compares, for each location, the weather data indicating the actual or expected absence or presence of rain or other precipitation with the determined absence or presence of precipitation determined from the received vehicle data following the thresholding procedure. If, for a particular location, the weather data indicates that there should be no precipitation for that time period, but the vehicle data indicates (from operation of windscreen wipers, operation of headlights and rain sensor data) that there is rainfall or other precipitation, then the module 170 modifies the weather data to indicate that there is precipitation at that location.

The thresholds can be defined based on the number of indicative events (for example, operation of windscreen wipers, operation of headlights or rain sensor data indicating the presence of rain) originating from a particular region or other location within a given time interval that needs to be exceeded in order to reliably indicate the presence of a given meteorological condition.

The thresholds used in a particular case can depend on the nature and severity of the weather conditions in question. For example, a higher threshold might be used to determine the presence of heavy rain, and a lower threshold might be used to determine the presence of light rain. The thresholds can also depend on the estimated number of suitably equipped vehicles that could generate data indicative of a weather condition. That number of available vehicles can be determined based on information about the current local traffic density obtained, for example, from vehicle ultrasound and radar sensor data that indicates inter-vehicle distance, as well as from time-resolved, road-specific historical traffic statistics such as those used in the Tom-Tom IQ Routes system. The process of comparing a number of vehicles or events to a threshold for embodiments described herein can equally comprise comparing a proportion of vehicles (for example compared to the number of vehicles present) or events (for example compared to the number of possible events) to a threshold for embodiments described herein.

Models used to define the required thresholds to indicate the presence or absence of a given weather condition can be determined heuristically. Alternatively, all collected event data or other status or sensor derived data can be stored in a historical database and statistically analysed by correlating them with historical external weather data, other associated parameters, and a posteriori verified weather condition incidents. By using such historical statistical analysis, models for calculating the required thresholds for a given situation can be derived such that the probability of false predictions is minimised. As the database grows, the statistical analysis can be repeated regularly in order to continuously improve the derived models. Having collected a sufficient amount of historical and regional data, the models can be made dependent also on, for example, the time of day, the season, the region type (for example, coast, mountain, desert, city) or on specific regions (for example, regions with known high fog probability).

Once the weather data has been verified or amended, it can be used for any suitable purpose. For example, the weather data can be used to generate a modified or verified weather map or weather movie.

In some embodiments, the modified or verified weather data is transmitted to the mobile devices, for example the PNDs 200a to 200e, where it can be viewed or used for any desired weather related application or process. In many cases, the transmission path to the PNDs or other mobile devices is bandwidth limited and it is desirable to limit the amount of data transmitted to the PNDs or other mobile devices. That is the case, in particular, with regard to the transmission of weather data, which can involve the transmission of large quantities of data on a regular basis, for example every 15 minutes, as weather forecasts are updated.

In some embodiments, the server 150 is configured to process the weather data received from the weather data source 180 and to generate weather warnings if the weather data indicates severe weather for a particular area.

The generation of weather warnings can be performed in dependence on the vehicle data, to ensure that the weather warning is consistent with the vehicle data. In some cases, a weather warning can be generated based entirely on the vehicle data.

Depending on the kind of weather conditions in question, the coincidence of several different events identified from data from the same vehicle, or of multiple similar events from data from multiple vehicles can strengthen the indication of a specific meteorological condition and thus trigger a corresponding warning. The integration of multiple events indicated by data from the same or different vehicles, and the correlation with weather data from an external source, for example the data source 180, can greatly improve the robustness of weather warnings, in particular in comparison to a reliance on vehicle sensor data alone which can be deceived by particular circumstances (for example presence of the vehicle in a garage or tunnel, or effect of vehicle heating).

Figure 7:
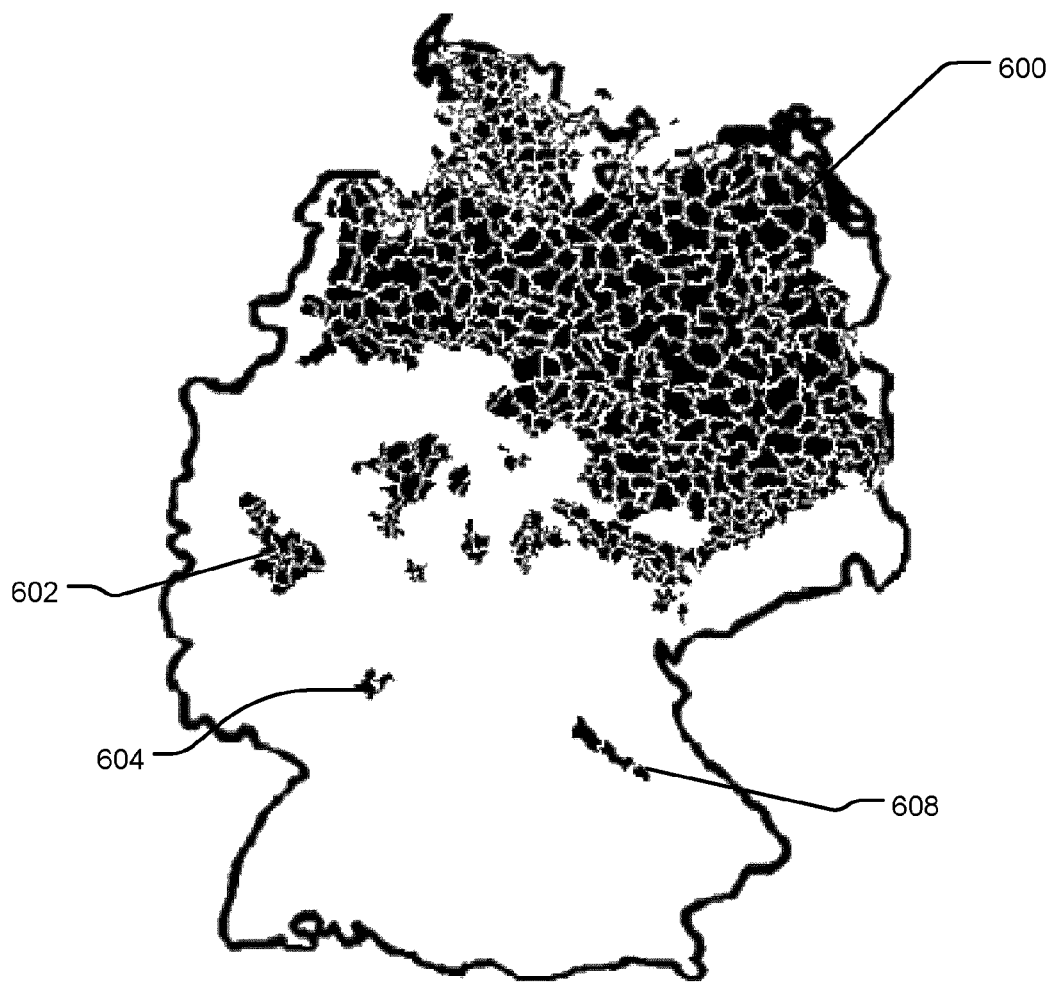
FIG. 7 is an illustration showing areas for which a weather warning is current overlaid on a map.

FIG. 7 shows areas 600, 602, 604 and 608 (and other similar areas) of Germany for which a storm warning is current. The server 150 determines the areas of the storm warning based upon the received weather data, and transmits weather warning data representative of those areas to PNDs or other mobile devices, for example to device 200.

In one mode of operation, the server 150 includes the weather warning data in periodic, general transmissions to all navigation devices in a region. In a variant of this embodiment, in response to specific events reported by an individual vehicle or vehicles, additional dedicated weather-related warnings, for example on road ice or extremely heavy rain, are transmitted to all connected vehicles in the vicinity of the original individual vehicle or vehicles, for which their current position and route indicates that the warning will be directly relevant to them. The server 150 is configured to distribute such localised warnings on an expedited basis such that the affected vehicles receive the weather-related warning faster than they would via the periodic weather warning transmissions (which will nevertheless also incorporate the localised warning). The received weather warning data can be used by the devices, for example devices 200a to 200e, to adapt routing and modify ETAs.

In each case, the weather warning data transmitted by the server 150 can include time data representative of a start time, end time or duration of the weather warning. The use of vehicle data received from the devices in determining at least one weather-related condition, for example in verifying or amending weather data, has already been described. In the case of FIG. 7, such data can be used to determine, amend or verify the areas to which the weather warning applies. The data can also be used to modify or verify the duration of a weather warning.

In some embodiments the server 150 determines the lifetime of a weather warning by analysing the absence or presence of certain weather-related events represented by the vehicle data received from vehicles, in combination with external information such as the weather data. For example, the server 150 may correlate a rise in regional temperature indicated by the weather data from the source 180 with the absence of wheel slip events within a certain time interval and observed back-to-normal average vehicle speeds determined from status or sensor derived data received from vehicles, in order to terminate a road-specific ice warning.

The server 150 may also, for example, correlate recent and forecast rain radar information from the weather data source 180 with an absence of light activation and windscreen wiper activity for vehicles along a particular road, to render a warning of rain along the road obsolete.

By performing weather warning analysis based on variation of vehicle data and weather data over a period of time, rather than based only on instantaneous vehicle data and weather data the accuracy of the weather warning, and its duration, can be increased. For example, if icy conditions are determined to be occurring and a weather warning issued due to the detection of a large number of slip events, the weather warning may be maintained even if the number of slip events reduces, if the weather data indicates that the temperature has not risen in the intervening period of time. In that case, the reduction in the number of slip events might be due for example to drivers driving more carefully (due to the weather warning, for instance).

The accuracy of weather warnings can be increased further by applying a statistical model that represents relationships between historical variations of vehicle data and/or weather data over a period of time, and the occurrence of particular weather conditions.

Depending on the type of weather condition, the server 150 can use prior knowledge of the typical lifetime of the weather condition in question together with the current age of a particular weather warning relating to the weather condition in determining whether or not to terminate the weather warning.

In some embodiments the server 150 requires not only the absence of originally indicative events, represented by data from the vehicles, but also the presence of certain contra indicative events in order to terminate a warning.

In some embodiments, thresholds are defined on the number of indicative events, based upon status or sensor-derived data received from vehicles, within a time interval under which the observed event incident rate needs to drop before a warning is determined to be obsolete by the server 150. Such thresholds are not necessarily equal to the thresholds defined for issuing a warning in the first place, and instead may be lower. Such thresholds usually depend on the nature and severity of the weather condition, on the age of the warning, on the value and reliability of involved parameters extracted from the external weather source, and on information concerning the estimated number of potential event sources (i.e. suitably equipped vehicles) present at a road or area in question. After the predefined threshold criteria for cancelling a warning is fulfilled, in some embodiments the server 150 maintains the warning for a succeeding period of time, which can be referred to as a warning lag, for example depending on the nature of the weather condition in question and on any other parameters that may be indicative of the weather condition The dependence of the thresholds and the warning lag on the age of the warning and the other parameters can be determined heuristically, but can also in a more sophisticated variant be derived from an off-line statistical analysis during which historical data about the involved parameters is correlated with the lifetime of historical, a posteriori verified weather warnings. The model generation process can be repeated as the available data increases. Having collected a sufficient amount of historical and regional data, the models for determining thresholds for weather warning generation or removal can likewise be made dependent also on the time of day, the season, the region type, or can be made specific to individual regions.

The use of vehicle data, for example status or sensor derived data received from vehicles, in verifying, amending or generating weather data or weather warnings has been described. Such data can also be used in statistical procedures for correlating traffic behaviour with weather conditions. One example of such a procedure relates to the determination of the effects of weather conditions on speed of travel along different road segments.

In a variant of the embodiment of FIG. 1, the server 150 uses historical vehicle data from in-vehicle devices, such as device 200 in a correlation procedure to determine the effects of weather conditions on speed profiles.

At a first stage of the procedure the server 150 obtains historical weather data representative of weather conditions for a region represented by digital map over a significant period of time, for example one year. The server 150 also has access to large quantities of probe data stored in the data store 160 and representing the movement of vehicles over roads or other thoroughfares represented by the digital map.

The probe data can be processed to obtain, for example, one or more of the following: average vehicle speeds along individual road segments per time bin; traffic density on individual road segments per time bin (obtained for example from extrapolated and normalised density of navigation devices or from ultrasound distance detectors located at the front and back of vehicles); statistical spread of speeds for each road segment and time bin; jam probabilities for individual road segments and time bins.

In this case the probe data also includes vehicle data, for example status or sensor-derived data obtained from in-vehicle devices, that is representative of, or can be correlated with, particular weather conditions. Such weather-related data obtained from individual vehicles can include for example data representative of slip events, operation of fog lamps, operation of windscreen wipers, temperature measurements, or rain detection, or any other suitable parameters, as already described.

The weather data can represent one or more different weather types, for example one or more of: presence or amount of precipitation such as rainfall, hail or snow; windspeed; wind direction; presence or amount of ice or lying snow; presence or amount of surface water; presence or amount of fog; visibility level; temperature. The weather data obtained from any suitable source, for example official weather records maintained by government or commercial agencies. Weather data from multiple sources may be used.

The server 150 has access to a sufficiently large archive of weather data and probe data to allow statistically significant measurement of weather dependent speed averages and their significance. The server 150 applies correlation techniques to correlate variation in average speed for different segments of roads or other thoroughfares of the digital map with the variation in the or each weather condition. The modelling module 170 can also derive statistical correlations between weather conditions and the obtained vehicle data such as status or sensor derived data, as well as, for example, jam probability, drivers' route preferences or any other traffic-related parameter if desired. The server 150 provides offline statistical analysis for calculating speed profiles and weather influence.

It has been found that a classification of different road types based on their sensitivity to weather conditions is useful in performing the correlation procedure. For example, precipitation intensity alone is often not sufficient as a parameter within some algebraic expression giving the average speed modification for all roads. The influence of precipitation can be non-linear and discontinuous in some cases, depending on the local traffic scenario and road layout.

In one mode of operation each road segment is classified to one of a plurality of road type classifiers (for example, 10 different road type classifiers may be used). Each classifier may represent roads having one or more characteristics, for example width, number of carriageways, surface type, average speed or traffic volume under normal conditions, urban or rural location, proximity to traffic junction or traffic lights. Functional road classifications (FRCs) such as those used by TomTom International BV in their products may be used as the road classifiers. Each road segment may be assigned a classifier based on a priori assessment of properties of the road segment or, alternatively, each road segment may be assigned a classifier based on a posteriori determination of how speed properties of the segment vary with weather conditions. In that second case, each classifier may represent a respective level of sensitivity to at least one weather condition.

The number and types of classifications that are used can depend on the number of distinct reactions to weather conditions from different segments and the importance to traffic, and also on the limits of band-width for transmission of data to the devices 200a to 200e via channel 152, as in general the larger the number of classifications the larger the amount of data that needs to be transmitted to the devices. In one mode of operation, classification data representative of the classification of each road segment is transmitted to and stored as digital map data at the devices 200a to 200e.

For each classification, the reaction to different types and levels of weather conditions can be determined by correlating speed data for each segment of that classification with corresponding weather data representative of weather conditions at the road segment. Usually, the reaction represents modification of speed with respect to a weather-unimpaired speed profile. Congestion estimations can usually be inferred via the time-dependent speed profile as a deviation of free-flow speed. The correlation process can be a time-dependent process, which correlates weather data and speed data obtained for the same time of day or week, thus taking into account expected daily or weekly variations in average speed for particular segments.

The correlation process can also take into account variation of weather conditions over time and associated changes in speed or other travel conditions. For example, the correlation process can determine how quickly lying snow or ice has been found to melt or be removed for a given road segment or segments, or a given road classification type, for given variations in temperature or other weather condition over time. For example, it may be found that for some roads, lying snow and ice may be expected to disappear more rapidly than for other roads, given a certain rise in temperature. Given the large amount of historical data for many road segments, such multi-parameter correlations can be determined relatively accurately.

The correlation process can result in the generation of weather reaction data for each road segment classification type representing the expected modification of average speed in response to weather conditions of one or more types and levels of severity.

It has been found that the variation of speed with severity of weather for each road segment classification type can be modelled effectively using a quantitative model, for example an exponential model in which the speed modification varies exponentially with the severity of a particular weather condition. The weather reaction data can be fitted to the selected model using known fitting techniques The correlation and fitting processes are computationally costly and, in some modes of operation, are repeated only every 3 to 6 months or whenever a traffic engineer or other operator considers that changes that affect the results may have occurred.

References herein to correlation between two quantities may refer to any relationship that is established between variation in one quantity and variation of the other quantity. The correlation may be based on historical data.

Whilst embodiments described in the foregoing detailed description refer to GPS, it should be noted that the navigation device may utilise any kind of position sensing technology as an alternative to (or indeed in addition to) GPS. For example the navigation device may utilise using other global navigation satellite systems such as the European Galileo system. Equally, embodiments are not limited to using satellite-based systems but could readily function using ground-based beacons, inertial sensors, or any other kind of system that enables the device to determine its geographic location.

Whilst in embodiments described herein particular functionality is described as being provided at a server and other functionality is described as being provided at a device, for example at a PND or other mobile device, in alternative embodiments any of the described functionality can be provided at either a server or at a device. For example substantially all of the functionality is provided at a server in some embodiments, in which the server may operate as a navigation device. In other embodiments substantially all of the functionality is provided at a device, which may receive weather or other data directly from a source of such data rather than from the server.

Alternative embodiments of the invention can be implemented as a computer program product for use with a computer system, the computer program product being, for example, a series of computer instructions stored on a tangible data recording medium, such as a diskette, CD-ROM, ROM, or fixed disk, or embodied in a computer data signal, the signal being transmitted over a tangible medium or a wireless medium, for example, microwave or infrared. The series of computer instructions can constitute all or part of the functionality described above, and can also be stored in any memory device, volatile or non-volatile, such as semiconductor, magnetic, optical or other memory device.

Whilst particular modules have been described herein, in alternative embodiments functionality of one or more of those modules can be provided by a single module or other component, or functionality provided by a single module can be provided by two or more modules or other components in combination.

It will also be well understood by persons of ordinary skill in the art that whilst the preferred embodiment implements certain functionality by means of software, that functionality could equally be implemented solely in hardware (for example by means of one or more ASICs (application specific integrated circuit)) or indeed by a mix of hardware and software. As such, the scope of the present invention should not be interpreted as being limited only to being implemented in software.

It will be understood that the present invention has been described above purely by way of example, and modifications of detail can be made within the scope of the invention.

Each feature disclosed in the description, and (where appropriate) the claims and drawings may be provided independently or in any appropriate combination.

Lastly, it should also be noted that whilst the accompanying claims set out particular combinations of features described herein, the scope of the present invention is not limited to the particular combinations hereafter claimed, but instead extends to encompass any combination of features or embodiments herein disclosed irrespective of whether or not that particular combination has been specifically enumerated in the accompanying claims at this time.

The invention claimed is:

1. A server system configured to determine at least one weather-related condition, comprising:
   a communications resource for receiving vehicle data indicative of a parameter of a vehicle; and
   a processing resource operable to obtain weather data and to process the weather data and the vehicle data to determine at least one weather-related condition in dependence on both the weather data and the vehicle data, the processing comprising verifying or amending the weather data based at least in part on the vehicle data.

2. The server system according to claim 1, wherein the vehicle data is representative of a property of at least one of a behaviour of the vehicle and a weather-related condition at the vehicle.

3. The server system according to claim 1, wherein the processing resource is configured to apply a statistical model to determine the weather-related condition based on the weather data and the vehicle data, the statistical model representative of relationships between historical vehicle data, historical weather data and historical occurrence of the at least one weather-related condition.

4. The server system according to claim 1, wherein the processing of the weather data and the vehicle data to determine at least one weather-related condition comprises generating, amending or verifying warning data representative of a weather-related warning.

5. The server system according to claim 4, wherein the processing resource is configured to generate, amend or verify the warning data in dependence on variation of at least one of the weather data and the vehicle data over a period of time.

6. The server system according to claim 4, wherein the processing resource is configured to generate, amend or verify the warning data by applying a statistical model representative of relationships between historical variations of vehicle data over a period of time, historical variations of weather data over a period of time and historical occurrence of the at least one weather-related condition.

7. The server system according to claim 4, wherein the warning data comprises time data representative of the start, end or duration of the weather-related warning, and the processing resource is configured to monitor the vehicle data and to generate, verify or modify the time data in dependence on the vehicle data.

8. The server system according to claim 1, wherein the weather-related data is representative of a boundary of an area of weather, and the processing resource is configured to verify or modify a location of the boundary in dependence on the vehicle data.

9. The server system according to claim 1, wherein the communications resource is configured to receive location data representative of the location of the vehicle and to associate the vehicle data with the location.

10. The server system according to claim 1, wherein the vehicle data comprises data obtained from at least one of: a rain sensor; a temperature sensor; an acceleration sensor; an angular momentum sensor; a brake sensor; a speed sensor; an ultrasound sensor; a radar sensor; a slip sensor; and a sensor or monitoring unit for sensing or monitoring operation of one or more of the following: windscreen wipers, headlamps, sidelights, fog lamps, anti-lock braking system (ABS), air conditioning system, brakes, heating system.

11. The server system according to claim 1, wherein the processing resource is configured to receive the vehicle data from a plurality of vehicles.

12. The server system according to claim 11, wherein the processing resource is configured to modify the weather data for an area in dependence on at least one of a number of vehicles and a proportion of vehicles in the area for which the vehicle data is inconsistent with the weather data.

13. The server system according to claim 1, wherein the processing resource is configured to transmit a weather-related warning based on the determination to one or more devices.

14. A method of operating a server to determine at least one weather-related condition, comprising:

receiving vehicle data indicative of a parameter of a vehicle at the server; obtaining weather data at the server; and processing the weather data and the vehicle data to determine at least one weather-related condition in dependence on both the weather data and the vehicle data, the processing comprising verifying or amending the weather data based at least in part on the vehicle data.

15. A non-transitory computer-readable medium storing a set of instructions which, when executed by at least one processor of a server, causes the server to perform a method of operating a server to determine at least one weather-related condition, the method comprising:

receiving vehicle data indicative of a parameter of a vehicle at the server; obtaining weather data at the server; and processing the weather data and the vehicle data to determine at least one weather-related condition in dependence on both the weather data and the vehicle data, the processing comprising verifying or amending the weather data based at least in part on the vehicle data.

* * * * *